United States Patent
Morgan-Mar et al.

(10) Patent No.: US 8,818,130 B2
(45) Date of Patent: Aug. 26, 2014

(54) GEOMETRIC PARAMETER MEASUREMENT OF AN IMAGING DEVICE

(75) Inventors: David Morgan-Mar, Wollstonecraft (AU); Stephen James Hardy, West Pymble (AU); Matthew R Arnison, Umina (AU); Kieran Gerard Larkin, Putney (AU); Christine Anne Deller, Mount Kurring-gai (AU)

(73) Assignee: Canon Kabushiki Kaisha, Tokyo (JP)

( * ) Notice: Subject to any disclaimer, the term of this patent is extended or adjusted under 35 U.S.C. 154(b) by 1241 days.

(21) Appl. No.: 12/275,963

(22) Filed: Nov. 21, 2008

(65) Prior Publication Data

US 2009/0161945 A1 Jun. 25, 2009

(30) Foreign Application Priority Data

Dec. 21, 2007 (AU) ................................ 2007254627

(51) Int. Cl.
- *G06K 9/00* (2006.01)
- *G06K 9/36* (2006.01)
- *G06K 9/62* (2006.01)
- *H04N 17/00* (2006.01)
- *H04N 17/02* (2006.01)
- *G01D 18/00* (2006.01)
- *G01D 21/00* (2006.01)
- *G01P 21/00* (2006.01)
- *G01R 35/00* (2006.01)

(52) U.S. Cl.
USPC ........... 382/276; 382/141; 382/209; 348/187; 702/85

(58) Field of Classification Search
USPC ......... 382/100, 103, 106, 141, 153–154, 181, 382/190, 195, 199, 201, 203–206, 209, 382/217–218, 276; 348/42, 86–95, 348/135–141, 143, 175–176, 187–188
See application file for complete search history.

(56) References Cited

U.S. PATENT DOCUMENTS 4,583,840 A * 4/1986 Yabu et al. ...................... 355/30
6,915,008 B2 * 7/2005 Barman et al. ................ 382/154
(Continued)

FOREIGN PATENT DOCUMENTS

AU 2005203031 2/2007
WO WO 2005/096218 * 10/2005 ............... G06K 9/32

OTHER PUBLICATIONS

D. Lowe, "Distinctive Image Features from Scale-Invariant Keypoints", International Journal of Computer Vision 60(2), 91-110, 2004, Kluwer Academic Publishers. Manufactured in The Netherlands.*
Fung and David, "Implementation and Evaluation of Real-Time Pan-Tilt-Zoom Camera Calibration", Applications of Digital Image Processing XXXI, Proc. of SPIE vol. 7073, 70731K, (2008).*

(Continued)

*Primary Examiner* — Randolph I Chu
*Assistant Examiner* — Nathan Bloom
(74) *Attorney, Agent, or Firm* — Fitzpatrick, Cella, Harper & Scinto

(57) ABSTRACT

Disclosed is a method of determining at least one three-dimensional (3D) geometric parameter of an imaging device. A two-dimensional (2D) target image is provided having a plurality of alignment patterns. The target image is imaged with an imaging device to form a captured image. At least one pattern of the captured image is compared with a corresponding pattern of the target image. From the comparison, the geometric parameter of the imaging device is then determined. The alignment patterns include at least one of (i) one or more patterns comprising a 2D scale and rotation invariant basis function, (ii) one or more patterns comprising a 1D scale invariant basis function, and (iii) one or more patterns having a plurality of grey levels and comprising a plurality of superimposed sinusoidal patterns, the plurality of sinusoidal patterns having a plurality of predetermined discrete orientations. Also disclosed is a two-dimensional test chart for use in testing an imaging device, the test chart comprising a plurality of alignment patterns, at least one of said alignment patterns including one of those patterns mentioned above.

24 Claims, 7 Drawing Sheets

(56) References Cited

U.S. PATENT DOCUMENTS

| | | | |
|---|---|---|---|
| 7,031,493 B2 | 4/2006 | Fletcher et al. | 382/100 |
| 7,274,388 B2* | 9/2007 | Zhang | 348/187 |
| 2003/0137655 A1* | 7/2003 | Wegmann | 356/124 |
| 2004/0086197 A1* | 5/2004 | Fletcher et al. | 382/276 |
| 2006/0157574 A1* | 7/2006 | Farrar et al. | 235/494 |
| 2007/0092159 A1* | 4/2007 | Larkin et al. | 382/276 |
| 2008/0298706 A1* | 12/2008 | Brown et al. | 382/255 |

OTHER PUBLICATIONS

Skrypnyk, I.; Lowe, D.G.; , "Scene modelling, recognition and tracking with invariant image features," Mixed and Augmented Reality, 2004. ISMAR 2004. Third IEEE and ACM International Symposium on , vol., no., pp. 110-119, Nov. 2-5, 2004.*

Kannala, J.; Brandt, S.S.; , "A generic camera model and calibration method for conventional, wide-angle, and fish-eye lenses," Pattern Analysis and Machine Intelligence, IEEE Transactions on , vol. 28, No. 8, pp. 1335-1340, Aug. 2006.*

* cited by examiner

GEOMETRIC PARAMETER MEASUREMENT OF AN IMAGING DEVICE

CROSS-REFERENCE TO RELATED PATENT APPLICATIONS

This application claims the right of priority under 35 U.S.C. §119 based on Australian Patent Application No. 2007254627, filed Dec. 21, 2007, which is incorporated by reference herein in its entirety as if fully set forth herein.

TECHNICAL FIELD

The current invention relates to camera calibration and, in particular, to obtaining geometric parameters of an imaging system.

BACKGROUND ART

It is often desirable to capture images of a planar test chart containing patterns designed for the measurement of characteristics of the imaging system. For many purposes, the ideal configuration is to have the test chart oriented perpendicular to the optical axis of the imaging system. In practice, attaining such ideal alignment, or measuring deviations from the ideal alignment in an existing setup, can be achieved only to a certain accuracy, which imposes limits on the accuracy of the characteristics intended to be measured by the chart. In view of these non-ideal alignment issues, testing is a three-dimensional (3D) problem rather than a relatively simpler two-dimensional (2D) problem.

The problem of measuring the position and orientation of an object in three dimensions from two-dimensional images is well known and many methods have been developed in an effort to address this. While the position of visible features in two dimensions is well defined by images, removing ambiguities in the position along the third dimension is difficult.

Previous methods generally rely on one or more of the following techniques:

(i) imaging three dimensional objects or scenes of a known geometry, to provide reference points in known relative positions to one another in three dimensions;

(ii) imaging an object or scene from multiple spatial locations in order to use the phenomenon of stereo vision to remove ambiguities in the location of features in the third dimension;

(iii) imaging planar objects or planar portions of three dimensional objects where the planes are oriented at large angles away from being perpendicular to the optical axis of the imaging system, in order that the perspective projection distortion dominates over optical distortions of the imaging system.

These techniques are unsuitable for use in the case when the object to be imaged is necessarily planar and oriented close to perpendicular to the optical axis. This requirement occurs in cases such as an optical device manufacturing process where the imaging quality of many products must be tested rapidly.

Methods for measuring the 3D geometric parameters of an imaging system using a single photograph from a planar target rely on the detection of features on the object such as corners or dots in the image of the object. Such features can be detected and located to an accuracy of the order of one tenth of a pixel on the imaging sensor. This is not adequate to calculate the geometric parameters of the system to the accuracy that is required for certain system performance measurements. To partially compensate for the limited spatial resolution of feature detection, many such features are often used, covering much of the surface area of the object, although this still results in limited accuracy in the derived geometric parameters.

SUMMARY

It is an object of the present invention to substantially overcome, or at least ameliorate, one or more disadvantages of existing approaches.

In accordance with one aspect of the present disclosure there is provided a method of determining at least one three-dimensional (3D) geometric parameter of an imaging device, the method comprising the steps of:

(a) providing a two-dimensional (2D) target image comprising a plurality of alignment patterns;

(b) imaging said target image with an imaging device to form a captured image;

(c) comparing at least one said pattern of said captured image with a corresponding pattern of said target image; and (d) determining from said comparison said geometric parameter of the imaging device, wherein the alignment patterns include at least one of:

(i) one or more patterns comprising a 2D scale and rotation invariant basis function $$f_1(r, \theta) = \begin{cases} \mathrm{Re}\lfloor w(r, \theta) r^{i\alpha+p} e^{ik\theta} \rfloor, & r > r_0 \\ q, & r \leq r_0 \end{cases}$$

where $a \neq 0$, $k \neq 0$, and $q \neq 0$;

(ii) one or more patterns comprising a 1D scale invariant basis function $$f(x) = \cos(\beta \log|x| + \gamma); \text{ and}$$

(iii) one or more patterns having a plurality of grey levels and comprising a plurality of superimposed sinusoidal patterns, said plurality of sinusoidal patterns having a plurality of predetermined discrete orientations.

Also disclosed is a two-dimensional test chart for use in testing an imaging device, the test chart comprising a plurality of alignment patterns, at least one of said alignment patterns including one of those patterns mentioned above.

Disclosed are arrangements which use specially constructed patterns configured to assist correlation with images of the patterns as projected through an imaging system. With these patterns, the presently disclosed arrangements can make use of mathematical formulations of the various distortions caused by such projection to determine geometrical parameters of the relative orientations of the imaging system and the imaged object. Some of the advantages of this method over the prior art include:

- the ability to accurately determine 3D geometric parameters from a single image of a planar object;
- the ability to accurately determine 3D geometric parameters of an imaging system using only a small fraction of the surface of the object for alignment patterns; and
- the ability to accurately characterise other measurements, such as image quality, made without expending great effort on ensuring precise alignment of the measuring system.

BRIEF DESCRIPTION OF THE DRAWINGS

At least one embodiment of the present invention will now be described with reference to the following drawings, in which.

DETAILED DESCRIPTION OF EMBODIMENTS OF THE INVENTION

For applications such as making quantitative measurements of image quality, it is desirable to image a planar test chart with an imaging system, while either:

having the test chart in a precisely specified geometric configuration with respect to the imaging system, or being able to precisely measure the geometric configuration of the test chart with respect to the imaging system.

If the test chart can be set up in a specified configuration (for example, an accepted standard) the measurements of image quality can be characterised properly as being measured for that configuration. On the other hand, if the configuration of the test chart is not precisely controlled, but can be measured accurately while making the image quality measurements, then those quality measurements can be properly qualified in terms of the geometric alignment. It may also be possible to interpolate or extrapolate the image quality measurements to produce good estimates of image quality for another desired configuration.

Figure 6:
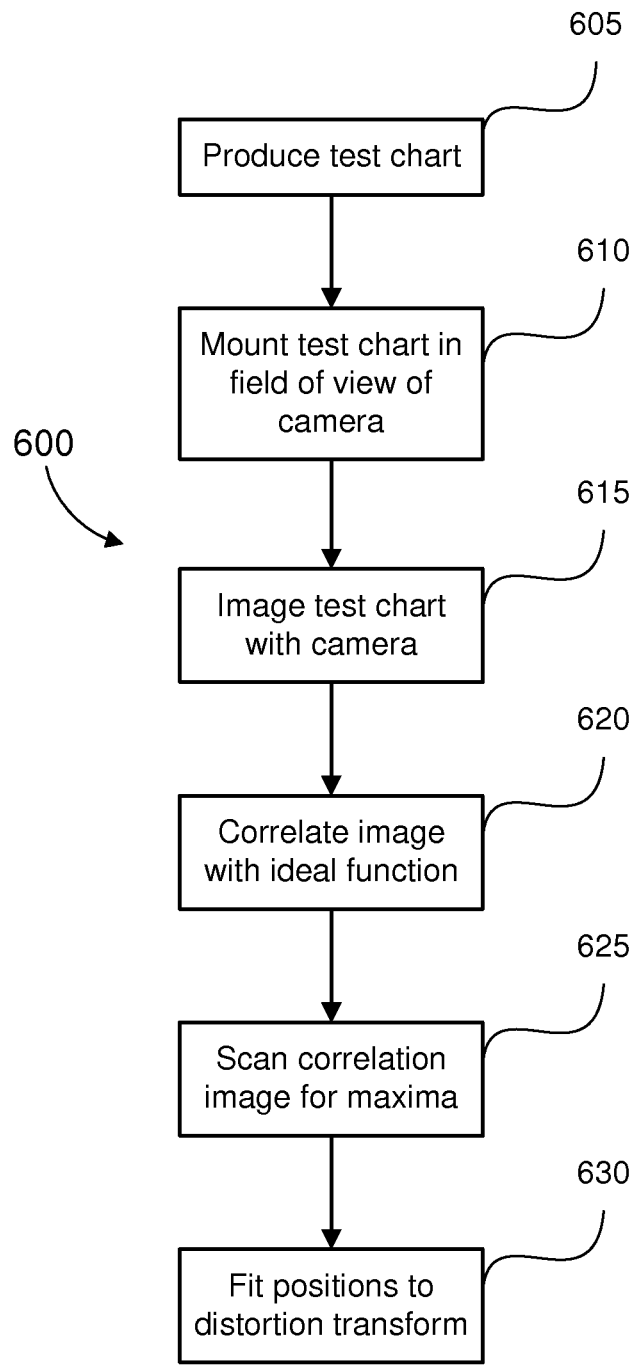
FIG. 6 shows a schematic flow diagram of a method of measuring a geometric parameter of an imaging device.
Figure 8:
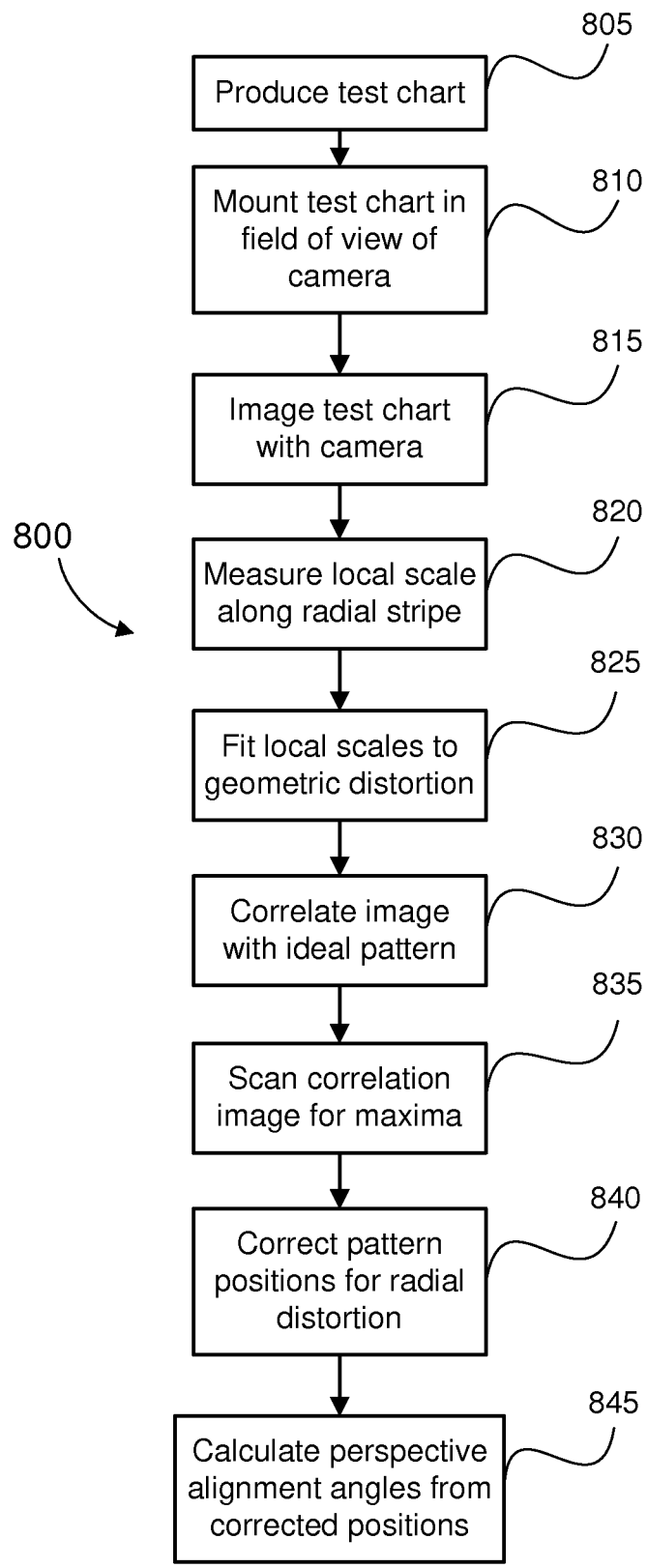
FIG. 8 shows a schematic flow diagram of an alternative method of measuring a geometric parameter of an imaging device.
Figure 10:
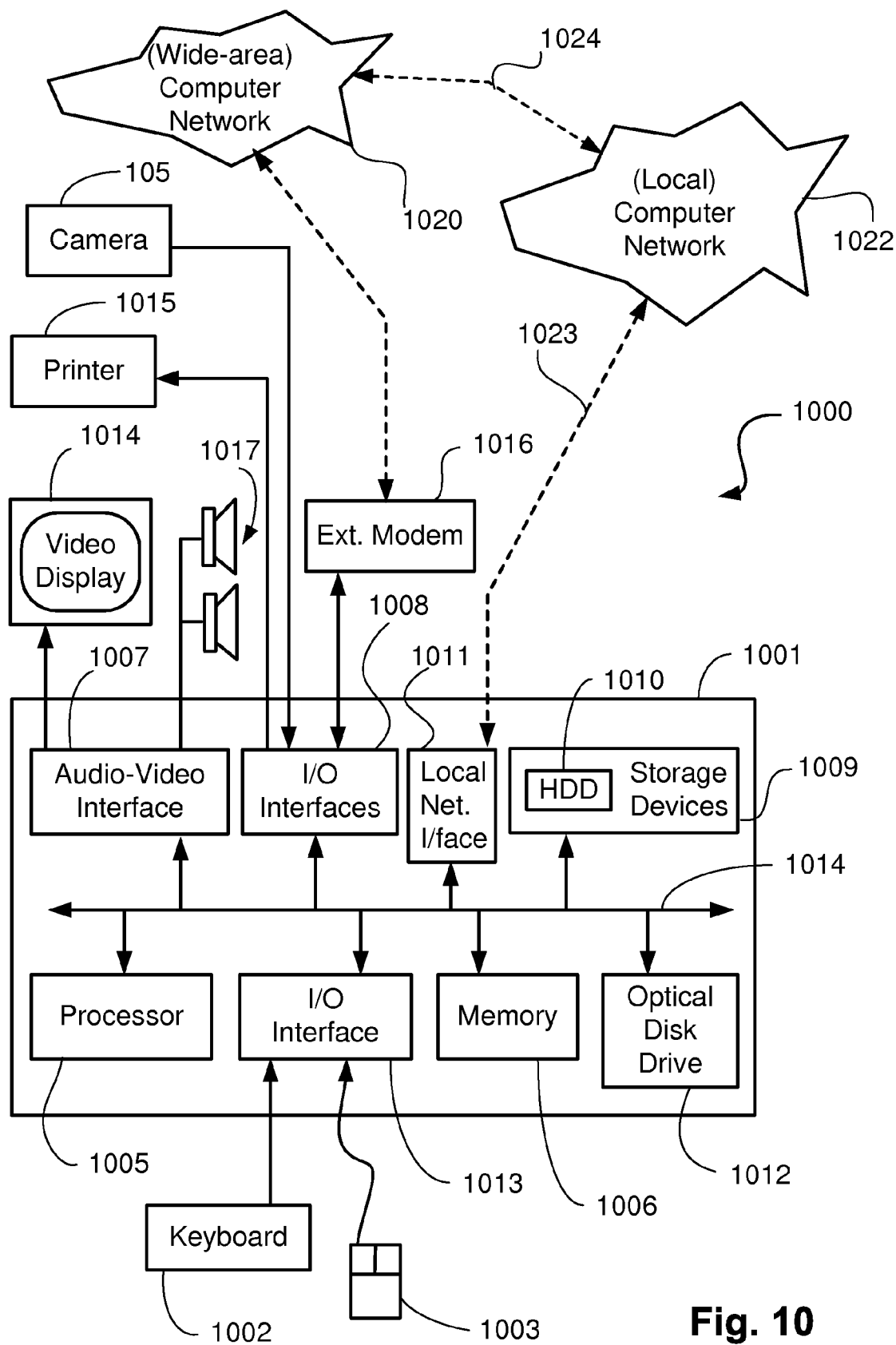
FIG. 10 is a schematic block diagram representation of a computer system in which the described arrangements may be performed.

The method of measuring a geometric parameter of an imaging device may be implemented using a computer system 1000, such as that shown in FIG. 10 wherein the processes of FIGS. 6 and 8 may be implemented as software, such as one or more application programs executable within the computer system 1000. In particular, the steps of the method of measuring a geometric parameter of an imaging device are effected by instructions in the software that are carried out within the computer system 1000. The instructions may be formed as one or more code modules, each for performing one or more particular tasks. The software may also be divided into two separate parts, in which a first part and the corresponding code modules performs the geometric parameter measuring methods and a second part and the corresponding code modules may be used to manage a user interface between the first part and the user, where required. The software may be stored in a computer readable medium, including the storage devices described below, for example. The software is loaded into the computer system 1000 from the computer readable medium, and then executed by the computer system 1000. A computer readable medium having such software or computer program recorded on it is a computer program product. The use of the computer program product in the computer system 1000 preferably effects an advantageous apparatus for measuring a geometric parameter of an imaging device.

As seen in FIG. 10, the computer system 1000 is formed by a computer module 1001, input devices such as a keyboard 1002, a mouse pointer device 1003 and a camera 105, and output devices including a display device 1014, a printer 1015 and loudspeakers 1017. An external Modulator-Demodulator (Modem) transceiver device 1016 may be used by the computer module 1001 for communicating to and from a communications network 1020 via a connection 1021. The network 1020 may be a wide-area network (WAN), such as the Internet or a private WAN. Where the connection 1021 is a telephone line, the modem 1016 may be a traditional "dial-up" modem. Alternatively, where the connection 1021 is a high capacity (eg: cable) connection, the modem 1016 may be a broadband modem. A wireless modem may also be used for wireless connection to the network 1020. In some implementations the camera 105 may be connected to a device or be a device in either of the networks 1020 and 1022 and further may be one of a number of such cameras imaging a scenes such a process or manufacturing line, such as in a camera assembly plant.

The computer module 1001 typically includes at least one processor unit 1005, and a memory unit 1006 for example formed from semiconductor random access memory (RAM) and read only memory (ROM). The module 1001 also includes an number of input/output (I/O) interfaces including an audio-video interface 1007 that couples to the video display 1014 and loudspeakers 1017, an I/O interface 1013 for the keyboard 1002 and mouse 1003 and optionally a joystick (not illustrated), and an interface 1008 for the external modem 1016, the printer 1015 and the camera 105. In some implementations, the modem 1016 may be incorporated within the computer module 1001, for example within the interface 1008. The computer module 1001 also has a local network interface 1011 which, via a connection 1023, permits coupling of the computer system 1000 to a local computer network 1022, known as a Local Area Network (LAN). As also illustrated, the local network 1022 may also couple to the wide network 1020 via a connection 1024, which would typically include a so-called "firewall" device or similar functionality. The interface 1011 may be formed by an Ethernet™ circuit card, a wireless Bluetooth™ or an IEEE 802.11 wireless arrangement.

The interfaces 1008 and 1013 may afford both serial and parallel connectivity, the former typically being implemented according to the Universal Serial Bus (USB) standards and having corresponding USB connectors (not illustrated). Storage devices 1009 are provided and typically include a hard disk drive (HDD) 1010. Other devices such as a floppy disk drive and a magnetic tape drive (not illustrated) may also be used. An optical disk drive 1012 is typically provided to act as a non-volatile source of data. Portable memory devices, such optical disks (eg: CD-ROM, DVD), USB-RAM, and floppy disks for example may then be used as appropriate sources of data to the system 1000.

The components 1005, to 1013 of the computer module 1001 typically communicate via an interconnected bus 1004 and in a manner which results in a conventional mode of operation of the computer system 1000 known to those in the relevant art. Examples of computers on which the described arrangements can be practiced include IBM-PC's and compatibles, Sun Sparcstations, Apple Mac™ or alike computer systems evolved therefrom.

Typically, the application programs discussed above are resident on the hard disk drive 1010 and read and controlled in execution by the processor 1005. Intermediate storage of such programs and any data fetched from the networks 1020 and 1022 may be accomplished using the semiconductor memory 1006, possibly in concert with the hard disk drive 1010. In some instances, the application programs may be supplied to the user encoded on one or more CD-ROM and read via the corresponding drive 1012, or alternatively may be read by the user from the networks 1020 or 1022. Still further, the software can also be loaded into the computer system 1000 from other computer readable media. Computer readable storage media refers to any storage medium that participates in providing instructions and/or data to the computer system 1000 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1001. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1014. Through manipulation of the keyboard 1002 and the mouse 1003, a user of the computer system 1000 and the application may manipulate the interface to provide controlling commands and/or input to the applications associated with the GUI(s).

The methods to be described may alternatively be implemented in dedicated hardware such as one or more integrated circuits performing the functions or sub functions of measuring a geometric parameter of an imaging device. Such dedicated hardware may include graphic processors, digital signal processors, or one or more microprocessors and associated memories.

Figure 1:
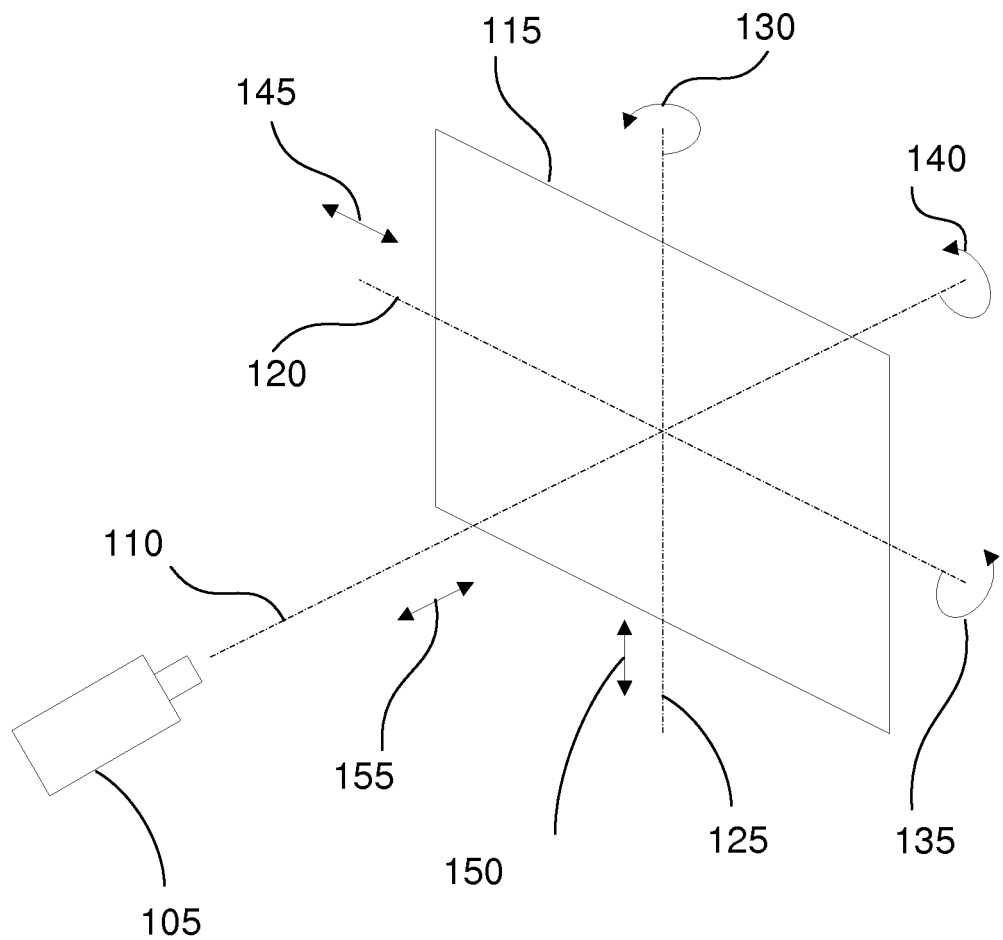
FIG. 1 is a schematic representation of a coordinate system defined by a test chart and a camera.

A schematic diagram of a test chart showing geometric alignment and degrees of freedom is shown in FIG. 1. The camera 105 defines a z-axis 110, equivalent to the optical axis of the camera 105. A chart 115 is placed in the field of view of the camera 105. The intersection of the z-axis 110 with the chart 115 defines the origin of a coordinate system, with x-axis 120 and y-axis 125 orthogonal to one another and to the z-axis 110. The x-axis 120 and y-axis 125 define a plane perpendicular to the z-axis 110. The chart 115 is desirably but not necessarily coincident with the plane defined by the x-axis 120 and y-axis 125, but may be rotated with respect to that plane. A rotation 130 about the y-axis 125 corresponds to a panning of the chart 115 with respect to the camera 105. A rotation 135 about the x-axis 120 corresponds to a tilting of the chart 115 with respect to the camera 105. If the rotations 130 and 135 are zero, the chart 115 will display no perspective distortion when imaged by the camera 105. If either or both of the rotations 130 and 135 are non-zero, then the chart 115 will display some perspective distortion when imaged by the camera 105, dependent on the angles of rotation. In addition to the perspective transformation of the chart 115 caused by the rotations 130 and 135, the chart 115 may exhibit rotational, scaling, and translational transformations. The rotation 140 about the z-axis 110 corresponds to a rolling of the chart 115 with respect to the camera 105. If the rotation 140 is non-zero, the chart 115 will be rotated by the same angle when imaged by the camera 105. Two translations 145 and 150 along the x-axis 120 and y-axis 125 respectively are also shown and will cause the chart 115 to be translated when imaged by the camera 105. A translation 155 along the z-axis 110 will cause the chart 115 to change in scale when imaged by the camera 105.

The geometrical alignment parameters shown in FIG. 1 are those corresponding to the relative spatial alignment of the camera 105 and the chart 115 and the associated six degrees of freedom. Each degree of freedom is associated with a specific transformation of the chart 115 as imaged by the camera 105.

When imaged by a camera, an additional transformation of the chart takes place, caused by optical projection of the chart through a lens or system of lenses of the camera to produce an image of the chart. In general, the scale of the projection through a lens or lens system may vary locally across different parts of the image. The resultant transformation is known variously as geometric lens distortion, or sometimes known as barrel or pincushion distortion.

Figure 2:
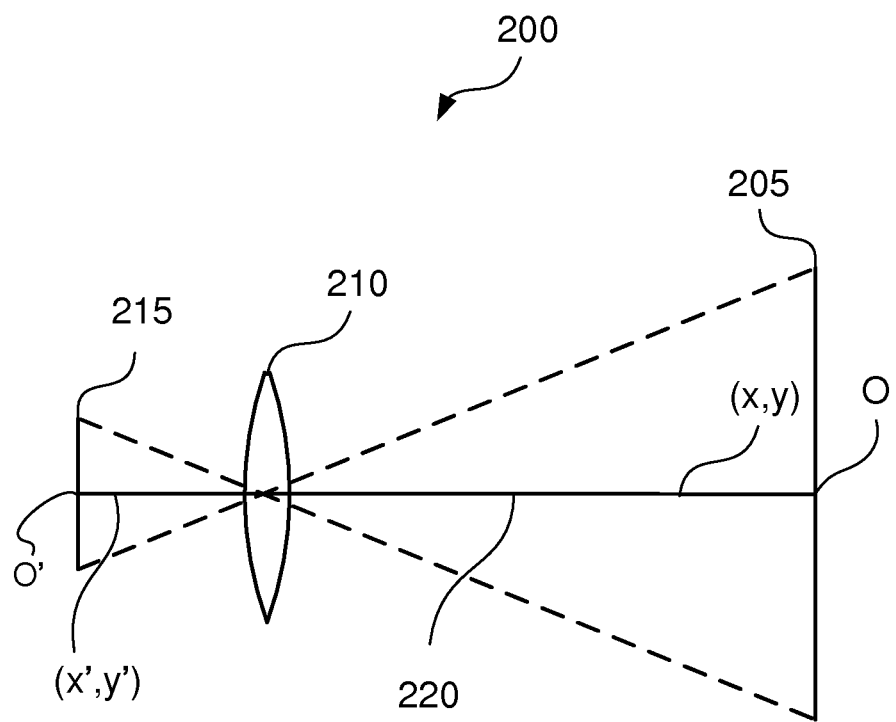
FIG. 2 is a schematic representation of an imaging system.

A schematic diagram of an imaging system 200 is shown in FIG. 2. An image of an object 205 is projected through a lens 210, forming an image at an image plane 215. The image plane 215 is typically coincident with an imaging sensor of the imaging system. Alternatively, the image plane 215 may be coincident with a manual focussing screen or an autofocussing sensor. For the purposes of this discussion, the image plane 215 is oriented perpendicular to the optical axis 220 of the imaging system 200 and the object 205 is a planar object which may or may not be oriented perpendicular to the optical axis 220. An image formed on the image plane 215 may contain geometric distortions caused by the lens 210. In the case that the object 205 is oriented perpendicular to the optical axis 220, the image formed is a scaled copy of the object 205, distorted only by the geometric distortion effects of the lens 210, and showing no distortion caused by perspective projection. If, however, the object 205 is not perpendicular to the optical axis 220, then the image formed will exhibit perspective distortion dependent on the angle between the object 205 and the optical axis 220.

The combination of coordinate transformations produced by the geometrical alignment of the object and camera (affine and perspective), and geometric distortion caused by the lens, comprise a class of parameters referred to as geometric parameters of the imaging system 200. Thus the angle of perspective is a geometric parameter. Other geometric parameters include the magnification of the lens or camera and the focal length of the lens.

Assuming no distortions in the system 200, a point (x, y) measured from an origin (O) at the optical axis in the object plane is mapped to a corresponding point (x', y') measured from an origin (O') at the optical axis in the image plane, where (x',y')=(sx, sy)

and s is a scale parameter.

If perspective distortion is present, the point (x, y) is mapped to $$(x', y') = s\left(\frac{ax+by+c}{gx+hy+1}, \frac{dx+ey+f}{gx+hy+1}\right) \quad \text{Equation 1}$$

where $$M = \begin{bmatrix} a & b & c \\ d & e & f \\ g & h & 1 \end{bmatrix}$$

is a constant matrix describing the perspective transformation.

This formulation of perspective includes translation and shear transformations in the plane of the object, but not rotation in that plane. A rotation in the object plane about the origin can be expressed as the transformation $$(x',y')=(x \cos \phi - y \sin \phi, x \sin \phi + y \cos \phi) \quad \text{Equation 2}$$

where $f$ is a rotation angle. Composing this with the perspective distortion defined by Equation 1 gives a representation of a transformation which is a combination of general affine and perspective transformations.

Geometric lens distortion can be modelled to a suitable approximation with a transformation of the form $$(x',y')=(1+k_1 r^2+k_2 r^4)(x,y) \quad \text{Equation 3}$$

where $$r^2=x^2+y^2$$

and $k_1$ and $k_2$ are constants for the given imaging system geometry.

In the general case when affine transformation, perspective projection, and geometric lens distortion are present, composing Equation 1, Equation 2, and Equation 3 gives the following result:

$$(x'', y'') = s(1 + k_1 r^2 + k_2 r^4)\left(\frac{ax' + by' + c}{gx' + hy' + 1}, \frac{dx' + ey' + f}{gx' + hy' + 1}\right) \quad \text{(Equation 4)}$$

where $$r^2 = \left(\frac{ax' + by' + c}{gx' + hy' + 1}\right)^2 + \left(\frac{dx' + ey' + f}{gx' + hy' + 1}\right)^2$$

$$(x', y') = (x\cos\varphi - y\sin\varphi, x\sin\varphi + y\cos\varphi)$$

and the constants are as described earlier. In this formulation, the rotation in the object plane is applied first, followed by the perspective distortion, followed by the geometric lens distortion, as this is the order in which the transformations are applied to the image of the object as it is captured by the imaging system. The scaling commutes with each function in the composition, so can be factored out and applied at any stage.

If the object 205 being imaged contains reference marks of known (x, y) coordinates, and the transformed coordinates (x', y') of the same marks in the image plane 215 can be measured, then Equation 4 can be solved simultaneously for the constants (s, a, b, c, d, e, f, g, h, $k_1$, $k_2$) by using standard error minimisation techniques. In particular, a Levenberg-Marquardt non-linear minimisation method may be used. The accuracy of the determination of the transformation constants depends on how accurately the original and transformed coordinates can be measured.

In order to measure transformed coordinates in an image plane 215 with minimal error, it is advantageous to have reference marks configured with this goal in mind. An example of such marks can be constructed from logarithmic radial harmonic functions (LRHF), defined as a complex function in polar coordinates as follows:

$$f_1(r,\theta)=w(r,\theta)r^{ia+p}e^{ik\theta}$$

where k is an integer parameter and a and p are real parameters of the function, and $w(r, \theta)$ is a weighting function.

These functions have the property that they are invariant under changes of scaling and rotation of the coordinate system except for a multiplicative constant.

Figure 3:
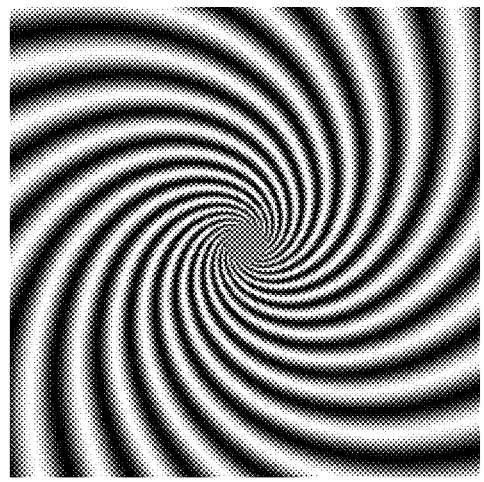
FIG. 3 is an image showing a logarithmic radial harmonic function.

LRHF functions can be represented in an image by taking the pixel intensities to be linearly related to the integer part of the real component of the function at the pixel coordinates. To avoid aliasing, constraints are imposed on the allowable values of the parameters k and a, and a region of pixels, around the origin of the function coordinate system where the oscillations approach or exceed the Nyquist frequency, is removed. The resulting image has pixel values determined by a linear mapping from the following function:

$$f_1(r, \theta) = \begin{cases} \text{Re}\lfloor w(r, \theta)r^{ia+p}e^{ik\theta} \rfloor, & r > r_0 \\ q, & r \leq r_0 \end{cases}$$

where q is a constant, $r_0$ is a radius inside which the oscillations exceed the Nyquist frequency, Re is the function giving the real part of a complex number, and the bracketing symbols represent the floor function. The linear mapping can be scaled to produce pixel values in a suitable range, such as 0-255. An image illustrating this form of an LHRF is shown in FIG. 3. Those skilled in the art will recognise that any pattern such as this can also be represented in a binary image, using halftoning algorithms, rather than as a greyscale image.

An advantage of using printed LRHFs is that the position of the centre of the pattern can be measured to an accuracy of a small fraction of a pixel using comparison techniques, including correlation. Correlation between the ideal pattern $f_1$ and an image m produces a two-dimensional image with a maximum value at the position where the image m best matches the pattern $f_1$.

Another example of reference marks suitable for precise measurement of image locations is the class of patterns comprised of one-dimensional scale invariant basis functions, which may be defined by a one-dimensional function as follows:

$$f_2(x)=\cos(\beta \log|x|+\gamma)$$

where $\beta$ and $\gamma$ are parameters and the x-axis may be oriented in any desired direction.

These functions have the property that they are invariant under changes of scaling of the coordinate system except for a multiplicative complex constant.

Figure 4:
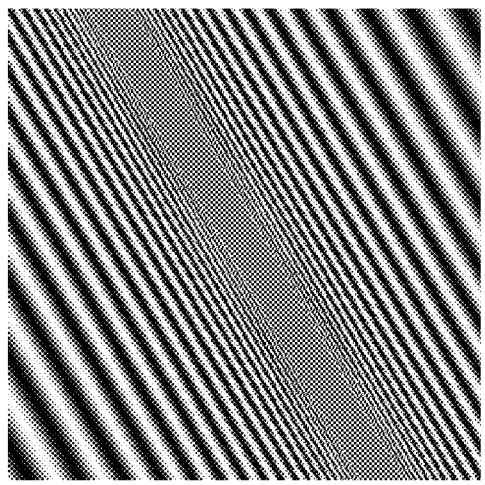
FIG. 4 is an image showing a one-dimensional scale invariant basis function.

One-dimensional scale invariant basis functions can be represented in an image by taking the pixel intensities to be linearly related to the value of the function at the pixel coordinates defined with respect to a chosen x-axis, which may be oriented arbitrarily. To avoid aliasing, constraints are imposed on the allowable values of the parameters $\beta$ and $\gamma$, and a region of pixels around the origin of the function coordinate system where the oscillations approach or exceed the Nyquist frequency is removed. An image illustrating his form of a one-dimensional scale invariant basis function is shown in FIG. 4.

An advantage of using printed one-dimensional scale invariant basis functions is that the line perpendicular to the chosen x-axis and passing through the origin can be measured to an accuracy of a small fraction of a pixel using correlation techniques. Whereas LHRFs are invariant to RST (Rotation, scale, and translation) transformations, one-dimensional scale invariant basis functions are invariant under the more general class of affine transformations.

One-dimensional scale invariant basis functions may be combined in different orientations to define a number of intersection points of the detectable lines, either by overlaying the patterns or by placing them in proximity. In this manner, a series of points defined in two dimensions in the image plane can be measured.

Other patterns with properties useful for providing accurate image comparisons/correlations may also be used.

Figure 5:
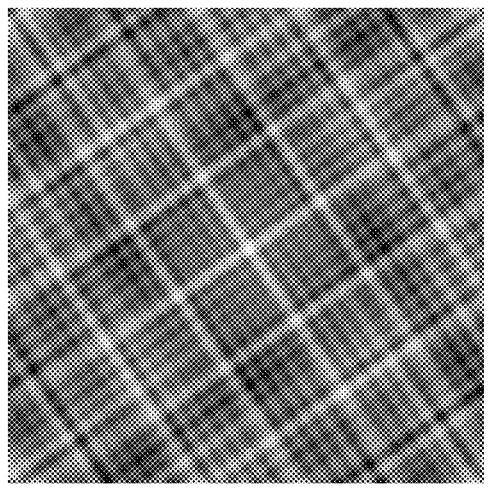
FIG. 5 is an image showing an example of a pattern comprised of a plurality of sinusoidal patterns.

Yet another class of patterns includes those which allow correlation techniques to produce accurate positions and which are also useful for other image measurement or imaging system characterisation purposes. An example is a pattern comprised of a plurality of superimposed sinusoidal patterns arranged in predetermined, discrete orientations and frequencies and represented by a plurality of grey levels. An image illustrating such a pattern is shown in FIG. 5. An advantage of such a pattern is that it may be used to simultaneously measure local properties such as affine transformation and optical transfer function of the imaging system in small regions of the image.

When the image m is formed by imaging an object containing an ideal pattern, some distortions of the ideal pattern will be present in the image m and will reduce the magnitude of the correlation peak. In some cases, these distortions are small and do not have a great effect on the result of the correlation. In other cases, the distortions are large enough to present difficulties to a naive approach to correlation between the ideal patterns and their projected images. A variety of correlation techniques and enhancements can be applied to improve the sensitivity and accuracy of the resultant measurement. Some examples of such techniques include phase-based correlation, maximum likelihood, and other techniques.

If multiple copies of the pattern are present in the object, the correlated image will contain a series of local maxima corresponding to the positions of each copy of the pattern in the object. These may be detected and the coordinates of all copies of the modified or transformed pattern measured. In this way, a set of coordinates in the object plane and a set of transformed coordinates corresponding to the same points in the image plane can be obtained.

Figure 7:
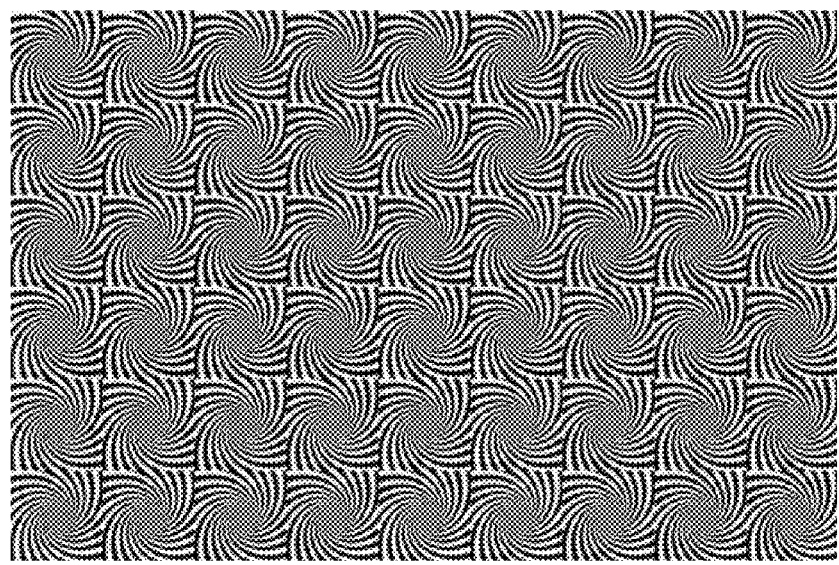
FIG. 7 shows an example of a chart containing multiple alignment patterns.

FIG. 6 shows a flow chart of a process 600 for measuring a geometric parameter of an imaging system. The process 600 may be performed in part using the system 1000 of FIG. 10. In the first step 605 a test chart is produced with a multitude of alignment patterns printed on it in known positions, such as illustrated in FIG. 7. The test chart may be calculated by the computer module 1001 executing a software application implementing the equations and pattern functions mentioned above and may be printed using the printer 1015. The test chart typically includes one or more images fabricated on to a substantially planar surface material. Alternatively, the test chart may be electronically displayed on a display device, such as an LCD panel. In a further alternative, the test chart may be projected onto a planar surface by an image projector.

In the next step 610, this chart is mounted or otherwise arranged in the field of view of an imaging device, such as the camera 105. In the next step 615 the camera 105 is used to take or capture an image m of the chart, forming the image on a sensor chip or imaging device therein. The camera 105 in this process 600 may be one camera being assembled as part of a manufacturing line of cameras. The captured image as formed by the camera 105 will contain the affine, perspective, and geometric lens distortions mentioned above. In the next step 620, the image m is correlated with the ideal version of the alignment patterns to produce a two-dimensional correlation image. The ideal version is typically an electronic version of the pattern before printing. Distortions or errors introduced during the printing process may typically be ignored or engineered out of relevance as such are reliably small in comparison to the correlation image. For example each correlation image when printed onto the test chart may be sized of at least about 40 mm×40 mm, thus being substantially larger than printer registration errors, noting that the test chart is imaged onto a relatively small image sensor, which in turn reduces any printing errors. Alternatively, any distortions or errors introduced during the printing process may be measured and characterised by another procedure (not described here), and that characterisation used to correct for the printer distortions. In the next step 625 the correlation image is scanned or otherwise assessed for local maxima, indicating the positions of the alignment patterns in the distorted image. In the next step 630 the positions of the measured alignment patterns in the image are used to estimate the distortion parameters from Equation 4 using a numerical analysis technique, for example Levenberg-Marquardt error minimisation.

The process 600 provides measurements of the various geometrical parameters described above, which specify:

the translation and rotation of the object in the object plane;

the rotation of the object about axes perpendicular to the optical axis;

parameters describing the geometrical distortion of the imaging system.

It can be shown that, in the small angle approximation, the angles by which the object are tilted, relative to a position perpendicular to the optical axis, are given by $$\theta_x = \arcsin(Dh)$$

$$\theta_y = \arcsin(Dg)$$

where g and h are the perspective transformation parameters previously defined, $\theta_x$ and $\theta_y$ are the angles of rotation about the x and y axes respectively, and D is the distance from the front principal plane of the lens 210 to the object 205, measured along the optical axis in the same units as used to measure the location of the patterns on the image sensor chip of the camera 105.

The image shown in FIG. 7 is only exemplary of one pattern that may be used, and the number and placement of the LHRF patterns may be varied. In general, a minimum of three LHRF functions is required to determine each of the scale, rotation, x and y translation, and x and y perspective parameters, but only under some assumed characterisation of the geometric lens distortion. Imaging additional patterns will also allow the geometric distortion parameters to be estimated, with increasing accuracy the more patterns are used. Imaging additional patterns will also improve the accuracy of the determination of all the parameters, so in practice an object containing a dense grid of patterns is to be preferred.

In an alternative process, a small number of patterns may be used to measure geometric parameters of the imaging system, by determining the geometric lens distortion first and removing it from the measured positions of patterns in the image plane. The corrected coordinates in the image plane can then be fitted for affine and perspective transformations without regard to geometric distortion, which greatly simplifies the fitting process in that the geometric parameters of interest can be measured from the coordinates of a small number of patterns. This approach requires that the perspective angles $\theta_x$ and $\theta_y$ are small, so that the distortions caused by perspective projection are small compared to the geometric lens distortion. However, this approach has the advantage that it requires fewer patterns and so more chart space can be dedicated to other patterns, which may be designed for characterising image quality or for other purposes. In particular, rotation in the object plane can be calculated from the angle of a line connecting two patterns in the image plane, translation in the object plane can then be calculated from the coordinates of a single pattern in the image plane, scale can be calculated from the distance between two patterns in the image plane corresponding to a known distance in the object plane, and perspective angles can be calculated from the differential distances in the image plane between pairs of patterns spaced at known distances in the object plane. Complete characterisation can be achieved with a minimum of four alignment patterns plus the patterns used to determine the geometric distortion.

FIG. 8 shows a schematic diagram of a process 800 for measuring a geometric parameter of an imaging system. In the first step 805 a test chart is produced with a sparse set of alignment patterns printed on it in known positions plus a radial distribution containing copies of a pattern suitable for measuring the local scale at positions along the radius. Again, the test chart may be calculated by the computer 1001 and printed by the printer 1015. In the next step 810 this chart is mounted in the field of view of an imaging device, such as the camera 105. In the next step 815 the camera 105 is used to take an image m of the chart, forming the image on its sensor chip. This image will contain the affine, perspective, and geometric lens distortions mentioned above. In the next step 820 the local scale of the image is measured at a series of closely spaced intervals along a radial stripe of the pattern. In the next step 825 the local scale measurements are used to produce a fit for the radial lens distortion. In the next step 830 the image m is correlated with the ideal version of the alignment patterns to produce a two-dimensional correlation image. In the next step 835 the correlation image is scanned for local maxima, indicating the positions of the alignment patterns in the distorted image. In the next step 840 the positions of the measured alignment patterns in the image are corrected for the geometric distortion characterised by the local scale measurements along the radial stripe, by adjusting their radial distances from the origin by the same amount that would be required to make the local scale constant along the measured stripe. In the next step 845 the corrected positions of the measured alignment patterns are used to derive the affine and perspective transformations, without regard to the removed geometric distortion.

Figure 9:
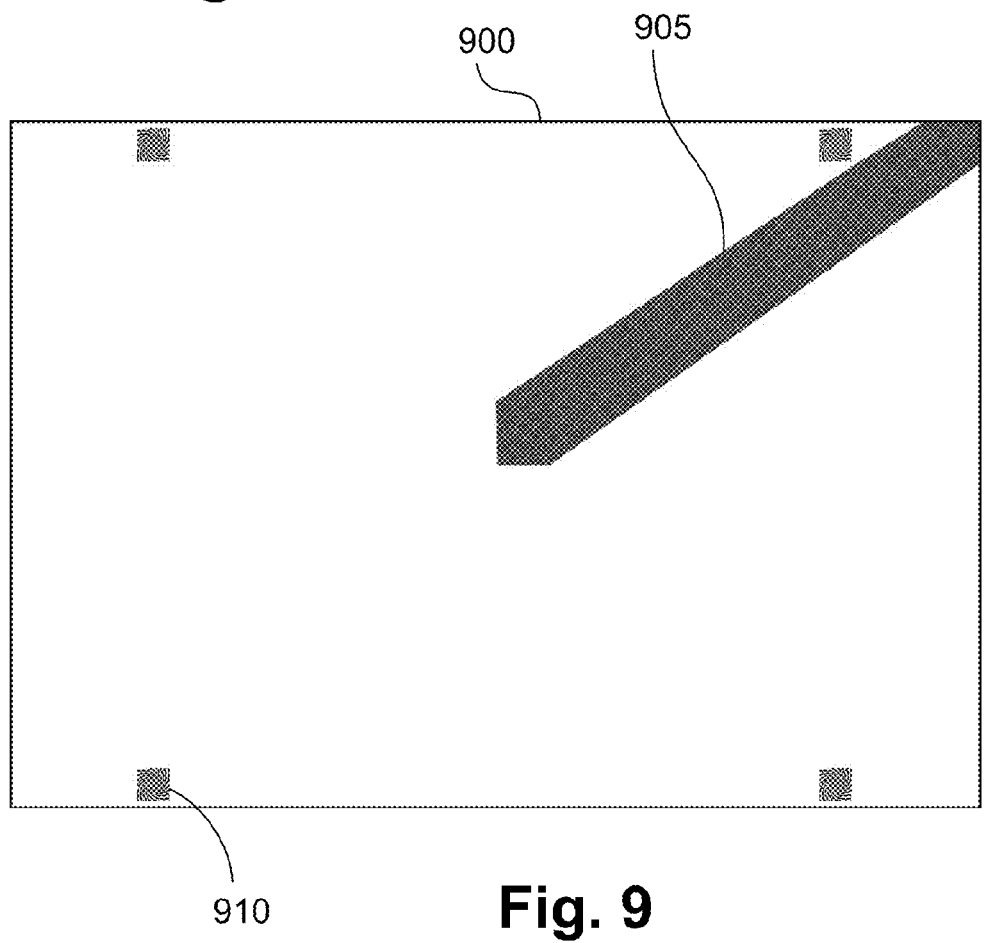
FIG. 9 shows an example of an alternative chart containing multiple alignment patterns.

An example of a chart 900 which could be used for this process is illustrated in FIG. 9. The example chart contains a radial stripe 905 of tiled patterns (not seen at the print resolution of FIG. 9) allowing measurement of local scale, plus an arrangement of four LHRF spirals 910, each corresponding to FIG. 3 but of reduced size. In an alternative embodiment, eight LHRF spirals may be used, forming the corners of two rectangles, one rectangle long in the x-dimension and short in the y-dimension, the other rectangle short in the x-dimension and long in the y-dimension. In this alternative embodiment, the LHRF spirals forming the rectangle long in the x-dimension can be used to measure the pan 130 of the chart 115, while the LHRF spirals forming the rectangle long in the y-dimension can be used to measure the tilt 135 of the chart 115 to high accuracy without requiring the placement of LHRF spirals near the corners of the chart 115.

The methods presently described overcome limitations of the prior art in measuring geometric parameters of an optical system by allowing accurate measurement from a single image of a planar object oriented nearly perpendicular to the optical axis of the system. This is useful in characterising optical image quality of imaging systems by virtue of allowing measurement of image quality and accurate geometrical configuration from a single image, rather than requiring multiple images of one or more targets. The ability to accurately determine geometric parameters from a single image of a planar object allows the image quality measurements to be characterised properly in terms of the system geometry. This in turn allows the useful measurement of image quality without expending a large effort to ensure precise alignment of the measurement system or taking additional images. This provides advantages in terms of ease of use and speed of measurement.

In an alternative implementation, the image plane may contain a sensor chip capable of providing a live video feed rather than discrete still images, which can be processed to indicate the geometric parameters of the object in real time, allowing rapid feedback and adjustment of the object to a desired alignment. Having adjusted or otherwise compensated for (mis)alignment, a further image obtained by the video feed may be used to perform actual geometric parameter measurements of the optical system and it's component parts (lens, sensor, camera etc.).

In another implementation, the described arrangements may be used to measure the mechanical alignment of the sensor chip within the camera body, relative to a reference plane defined with respect to the camera body rather than to the sensor.

Another implementation may be adapted to align other imaging planes within the camera. For example, by capturing an image of the viewfinder screen, the disclosed methods may be used to align the viewfinder screen into the same focal plane as the image sensor.

A further implementation involves an inverse determination. In this implementation, the above described procedures may be implemented to determine how the test chart image is detected as warped or distorted by the image sensor of the camera. Knowing the ideal representation of the test chart, the image can be "un-warped" by calculation of an inverse distortion function which may provide an electronic form of correcting for lens distortion. Once this is corrected using the inverse function, it is then possible to measure the angle of perspective.

Whilst the arrangements described above are explained with reference to digital cameras and are particularly applicable to consumer "pocket" digital cameras and SLR (single lens reflex) digital cameras, the testing procedures may be adapted for other forms of imaging devices. For example the image capture device may be a document scanner and the geometric parameters relate to the image-forming geometry of the scanner.

In a further implementation, the images of FIGS. 3, 4 and 5 may be composited together, in any one of their four alternatives (ie. 3+4, 3+5, 4+5, 3+4+5) to form another pattern including at least two of the described patterns and which may be used for geometric parameter and alignment measurement.

The arrangements described may be used to determine the focal length of a lens. By measuring the magnification at least two distances the focal length may be derived. Lens magnification m can be defined as $$m = \frac{D}{s}$$

where:

s is the distance from the sensor plane to the rear principal plane of the lens; and D is the distance from the object (chart) plane to the front principal plane of the lens.

Manipulating this equation it can be shown that:

$$s = -m\left(\frac{dm}{ds}\right)^{-1}.$$

If the imaging system is in focus, the lens will obey the equation $$f = \left(\frac{1}{s} + \frac{1}{D}\right)^{-1}$$

where $f$ is the focal length of the lens.

Combining these two second equations gives:

$$f = \frac{-m}{m+1}\left(\frac{dm}{ds}\right)^{-1}$$

By measuring the magnification of the imaging system at two or more different values of s (i.e, by moving the lens to a (slightly) different distance from the camera sensor), one can determine the value of (dm/ds), and hence $f$. It is observed that one measurement is not enough. Two measurements are enough. More than two measurements would give slight improvements. The lens movement should be small compared to s, say a fraction of a millimetre or so. The mathematics behind the above is quite straightforward, whilst the difficult part is typically measuring the magnification. However, with the procedures disclosed herein, magnification can be measured accurately whilst making sure the system is in focus. The measurement method presently disclosed gives us the ideal way to determine the focus at the same time.

In one specific implementation, the present disclosure provides a method of determining at least one three-dimensional (3D) geometric parameter of an imaging device, the method comprising the steps of:

(a) providing a two-dimensional (2D) target image comprising a plurality of alignment patterns, wherein the alignment patterns include one or more patterns comprising a 2D scale and rotation invariant basis function $$f_1(r, \theta) = \begin{cases} \operatorname{Re}[w(r, \theta)r^{ia+p}e^{ik\theta}], & r > r_0 \\ q, & r \le r_0 \end{cases}$$

where a≠0, k≠0, and q≠0;

(b) imaging the target image with an imaging device to form a captured image;

(c) comparing at least one pattern of the captured image with a corresponding pattern of the target image; and (d) determining from the comparison the geometric parameter of the imaging device.

In another specific implementation, the present disclosure provides a method of determining at least one three-dimensional (3D) geometric parameter of an imaging device, the method comprising the steps of:

(a) providing a two-dimensional (2D) target image comprising a plurality of alignment patterns, wherein the alignment patterns include one or more patterns comprising a 1D scale invariant basis function:

$$f(x) = \cos(\beta \log|x| + \gamma);$$

(b) imaging the target image with an imaging device to form a captured image;

(c) comparing at least one pattern of the captured image with a corresponding pattern of the target image; and (d) determining from the comparison the geometric parameter of the imaging device In another specific implementation, the present disclosure provides a method of determining at least one three-dimensional (3D) geometric parameter of an imaging device, the method comprising the steps of:

(a) providing a two-dimensional (2D) target image comprising a plurality of alignment patterns, wherein the alignment patterns include one or more patterns having a plurality of grey levels and comprising a plurality of superimposed sinusoidal patterns, the plurality of sinusoidal patterns having a plurality of predetermined discrete orientations;

(b) imaging the target image with an imaging device to form a captured image;

(c) comparing at least one pattern of the captured image with a corresponding pattern of the target image; and (d) determining from the comparison the geometric parameter of the imaging device.

The methods may each be augmented by permutation, combinations and composites of the specific alignment patterns presently disclosed.

INDUSTRIAL APPLICABILITY

The arrangements described are applicable to the computer and image processing industries, and particularly for the manufacture and testing of cameras and other imaging devices and systems.

The foregoing describes only some embodiments of the present invention, and modifications and/or changes can be made thereto without departing from the scope and spirit of the invention, the embodiments being illustrative and not restrictive.

We claim:

1. A method of determining three-dimensional (3D) geometric parameters of an imaging device, the method comprising the steps of:
    (a) providing a two-dimensional (2D) target image comprising a plurality of alignment patterns;
    (b) imaging said target image with an imaging device to form a captured image;
    (c) comparing at least one said pattern of said captured image with a corresponding pattern of said target image; and
    (d) determining from said comparison said geometric parameters of the imaging device,
    wherein the geometric parameters comprise at least one geometric parameter describing a geometric lens distortion transformation between said target image and said captured image and at least one geometric parameter describing a perspective transformation between said target image and said captured image,
    wherein the geometric parameter describing the perspective transformation is determined based on said geometric parameter describing the geometric lens distortion transformation.

2. A method according to claim 1, where said alignment patterns are represented as binary images using a half-toning algorithm.

3. A method according to claim 1, where said geometric parameters further comprise a parameter describing a translation of said target image from a reference position.

4. A method according to claim 1, where said geometric parameters further comprise a parameter describing a translation of said target image from a reference position.

5. A method according to claim 1, where said geometric parameters further comprise a parameter describing a scaling of said target image from a reference size.

6. A method according to claim 1, where said geometric parameters further comprise a parameter describing the focal length of the lens system of the said imaging device.

7. A method according to claim 1, where said geometric parameters further comprise a parameter describing the location of a principal point of the lens system of the said imaging device.

8. A method according to claim 1, further comprising the step of aligning said target image to said imaging device so that distortion of said captured image compared to said target image caused by perspective transformation is small when compared to the distortion of the said captured image compared to said target image caused by geometric lens distortion of the imaging device.

9. A method according to claim 1, where said geometric parameter describing the geometric lens distortion transformation between said target image and said captured image and said geometric parameter describing the perspective transformation between said target image and said captured image are determined by simultaneous fitting to a composite transformation function characterised by said plurality of geometric parameters.

10. A method according to claim 1, where said at least one geometric parameter that describes the perspective transformation from said target image to said captured image, and said at least one geometric parameter that describes the geometric lens distortion transformation from said target image to said captured image, are derived by the steps of:
   (A) deriving said parameters characterising said geometric lens distortion by said comparison of at least one pattern of said captured image with a corresponding pattern of said target image;
   (B) transforming said captured image according to an inverse of said geometric lens distortion parameters to produce a modified captured image; and
   (C) deriving said parameters characterising the perspective transformation by comparing at least one pattern of said modified captured image with a corresponding pattern of said target image.

11. A method according to claim 10, wherein step (B) comprises modifying coordinates of said captured image according to said derived parameters.

12. A method according to claim 1, where said target image is an image fabricated on to a substantially planar surface material.

13. A method according to claim 1, where said target image is an image displayed on a display device.

14. A method according to claim 1, where said target image is an image displayed on a projection surface by an image projector.

15. A method according to claim 1, where said imaging device is a document scanner and said geometric parameters relate to the image-forming geometry of said scanner.

16. A method according to claim 1, where said imaging device is a camera and said geometric parameters relate to the image-forming geometry of said camera.

17. A method according to claim 1, where said geometric parameters are used to determine the alignment of an imaging plane within said imaging device, relative to a reference plane.

18. A method according to claim 17, where said imaging plane is coincident with an imaging sensor of said imaging device.

19. A method according to claim 17, where said imaging plane is coincident with a manual focusing screen of said imaging device.

20. A method according to claim 17, where said imaging plane is coincident with an autofocussing sensor of said imaging device.

21. A method according to claim 1, wherein step (c) comprises correlating a pattern of said captured image with a pattern of said target image.

22. A method according to claim 1, wherein at least one said alignment pattern of said target image comprises a composite of at least two of the patterns (i) and (ii).

23. A method according to claim 1, wherein said alignment patterns include one or more patterns comprising a 2D scale and rotation invariant basis function $$f_1(r, \theta) = \begin{cases} \mathrm{Re}\lfloor w(r, \theta) r^{i\alpha+p} e^{ik\theta} \rfloor, & r > r_0 \\ q, & r \le r_0 \end{cases}$$

where $\alpha \neq 0$, $k \neq 0$, and $q \neq 0$.

24. A method according to claim 1, wherein said alignment patterns include one or more patterns having a plurality of grey levels and comprise a plurality of superimposed sinusoidal patterns, said plurality of sinusoidal patterns arranged in a plurality of predetermined discrete orientations.

\* \* \* \* \*